(12) United States Patent
Sollars

(10) Patent No.: US 6,505,291 B1
(45) Date of Patent: Jan. 7, 2003

(54) PROCESSOR HAVING A DATAPATH AND CONTROL LOGIC CONSTITUTED WITH BASIS EXECUTION BLOCKS

(75) Inventor: Donald L. Sollars, Milpitas, CA (US)

(73) Assignee: Brecis Communications, San Jose, CA (US)

( * ) Notice: Subject to any disclaimer, the term of this patent is extended or adjusted under 35 U.S.C. 154(b) by 0 days.

(21) Appl. No.: 09/697,911

(22) Filed: Oct. 26, 2000

Related U.S. Application Data

(63) Continuation of application No. 09/120,041, filed on Jul. 21, 1998, now Pat. No. 6,216,218, which is a continuation-in-part of application No. 08/963,387, filed on Nov. 3, 1997, now Pat. No. 5,940,626, and a continuation-in-part of application No. 08/963,345, filed on Nov. 3, 1997, now Pat. No. 6,016,539.

(51) Int. Cl.$^7$ .................... G06F 9/34; G06F 13/40; G06F 12/10

(52) U.S. Cl. .......... 712/201; 712/33; 711/202; 711/206; 710/128

(58) Field of Search .............. 712/35, 9, 203, 712/248, 1, 6, 23, 205, 206, 220, 215, 208, 36, 218, 42, 201, 228, 34, 27, 33; 711/158, 119, 202, 206; 710/128; 103/27; 101/68, 67; 108/190, 714, 709, 200, 233, 252, 490

(56) References Cited

U.S. PATENT DOCUMENTS

| | | | |
|---|---|---|---|
| 3,766,532 A | 10/1973 | Liebel, Jr. .................. 712/247 |
| 4,525,780 A | 6/1985 | Bratt et al. ................. 711/163 |
| 4,901,235 A | 2/1990 | Vora et al. .................. 712/247 |
| 4,905,141 A | 2/1990 | Brenza ....................... 711/129 |
| 4,959,777 A | 9/1990 | Holman, Jr. ................ 711/141 |
| 5,179,734 A | 1/1993 | Candy et al. .................. 712/1 |
| 5,185,878 A | 2/1993 | Baror et al. ................. 711/123 |
| 5,218,707 A | 6/1993 | Little et al. ............ 395/800.39 |
| 5,228,135 A | 7/1993 | Ikumi ......................... 711/131 |
| 5,274,770 A | 12/1993 | Khim Yeoh et al. |
| 5,287,490 A | 2/1994 | Sites ..................... 364/DIG. 1 |
| 5,313,413 A * | 5/1994 | Bhatia et al. .................. 131/68 |
| 5,369,772 A | 11/1994 | Tubbs ......................... 326/39 |
| 5,375,209 A | 12/1994 | Maher et al. ................ 395/500 |
| 5,404,469 A | 4/1995 | Chung et al. ................ 395/397 |
| 5,408,622 A * | 4/1995 | Fitch ........................... 712/27 |
| 5,430,862 A | 7/1995 | Smith et al. ................. 395/500 |
| 5,438,668 A | 8/1995 | Coon et al. .................. 395/380 |

(List continued on next page.)

OTHER PUBLICATIONS

Computer Architecture and Quantitative Approach; Authors: John L Hennessy, David A. Patterson; Morgan Kaufmann Publishers, Inc., 1990, Chapter 3, entitled "Instruction Set Design: Alternatives and Principles", pp. 89–137.

Computer Architecture and Quantitative Approach; Authors: John L. Hennessey, David A. Patterson; Morgan Kaufmann Publishers, Inc., 1990, Chapter 5, entitled "Basic Processor Implementation Techniques", pp. 199–248.

Paten Cooperation Treaty's International Search Report for International Application No. PCT/US99/15274, dated Oct. 6, 1999.

*Primary Examiner*—Daniel H. Pan
(74) *Attorney, Agent, or Firm*—Blakely, Sokoloff, Taylor & Zafman, LLP.

(57) ABSTRACT

A processor is provided with a datapath and control logic, where the datapath and/or the control logic are constituted with basis execution blocks (BEB). Each BEB includes an addressable storage and an arithmetic logic unit (ALU) selectably coupled to each other in a manner that allows instruction execution and/or control decisions to be effectuated through storage read/write operations against the addressable storage and ALU operations performed by the ALU. In one embodiment, the addressable storage of each BEB is a cache memory. In another embodiment, the read, write and ALU operations are hierarchically organized.

3 Claims, 10 Drawing Sheets

U.S. PATENT DOCUMENTS

| | | | |
|---|---|---|---|
| 5,450,555 A * | 9/1995 | Brown, III et al. | 712/228 |
| 5,450,607 A | 9/1995 | Kowalczyk et al. | |
| 5,463,745 A * | 10/1995 | Vidwans et al. | 712/218 |
| 5,509,130 A * | 4/1996 | Trauben et al. | 712/215 |
| 5,511,182 A | 4/1996 | Le et al. | 395/559 |
| 5,517,665 A * | 5/1996 | Sprague et al. | 712/9 |
| 5,530,889 A | 6/1996 | Kametani | 712/247 |
| 5,544,092 A | 8/1996 | Gunther et al. | 395/651 |
| 5,557,760 A | 9/1996 | Nishii et al. | 395/310 |
| 5,568,401 A | 10/1996 | Narayanaswami | 364/514 A |
| 5,574,873 A | 11/1996 | Davidian | 395/376 |
| 5,574,927 A | 11/1996 | Scantlin | 395/800.41 |
| 5,619,667 A * | 4/1997 | Henry et al. | 712/208 |
| 5,701,432 A | 12/1997 | Wong et al. | 711/130 |
| 5,724,550 A | 3/1998 | Stevens | 711/146 |
| 5,742,802 A | 4/1998 | Harter et al. | 395/518 |
| 5,752,073 A * | 5/1998 | Gray, III et al. | 712/25 |
| 5,758,183 A | 5/1998 | Scales | |
| 5,761,484 A | 6/1998 | Agarwal et al. | 395/500 |
| 5,768,624 A | 6/1998 | Ghosh | 395/873 |
| 5,774,710 A | 6/1998 | Chung | 712/238 |
| 5,787,478 A | 7/1998 | Hicks et al. | 711/141 |
| 5,825,074 A | 10/1998 | Blomgren | |
| 5,893,147 A | 4/1999 | Deng | 711/130 |
| 5,909,695 A | 6/1999 | Wong et al. | 711/133 |
| 5,923,894 A | 7/1999 | Sollars | |
| 5,940,626 A | 8/1999 | Sollars | |
| 5,946,710 A | 8/1999 | Bauman et al. | 711/129 |
| 6,016,539 A | 1/2000 | Sollars | |
| 6,178,482 B1 | 1/2001 | Sollars | |
| 6,216,218 B1 * | 4/2001 | Sollars | 712/201 |

* cited by examiner

XLATN_XADDR = *PC

XA_SEL = XLATN_XADDR

AX_SEL = X

XLATN_YMASK = ØXØZ

AY_SEL = XLATN_YMASK

ALU_CMD = ADD

XLATN_ZADDR = *PC

ZA_SEL = XLATN_ZADDR

Z_SEL = AZ

---

XLATN_ADDR = DEST_ADDR

XA_SEL = XLATN_XADDR

AX_SEL = X

PROC_AYDATA = IMM

AY_SEL = PROC_AYDATA

ALU_CMD = ADD

XLATN_ZADDR = DEST_ADDR

ZA_SEL = XLATN_ZADDR

Z_SEL = AZ

NOTE: POPS FOR ALL "UNUSED" ELEMENTS—
EQUAL NOPS

FIG. 3A

```
XLATN_XADDR = *PC
      XA_SEL = XLATN_XADDR
      AX_SEL = X
XLATN_YMASK = 0X03
      AY_SEL = XLATN_YMASK
      ALU_CMD = ADD
XLATN_ZADDR = *PC
      ZA_SEL = XLATN_ZADDR
      Z_SEL = AZ
```

```
XLATN_XADDR = *STACK
      XA_SEL = XLATN_XADDR
      AX_SEL = X
XLATN_YADDR = *PC
      YA_SEL = XLATN_YADDR
XLATN_YMASK = 0X02
      AY_SEL = XLATN_YMASK
      ALU_CMD = ADD
      ZA_SEL = AZ
      Z_SEL = Y
```

```
XLATN_XADDR = *STACK
      XA_SEL = XLATN_XADDR
      AX_SEL = X
XLATN_YMASK = 0X02
      AY_SEL = XLATN_YMASK
      ALU_CMD = ADD
XLATN_ZADDR = *STACK
      ZA_SEL = XLATN_ZADDR
      Z_SEL = AZ
```

```
PROC_ZDATA = IMM
XLATN_ZADDR = *PC
      ZA_SEL = XLATN_ZADDR
      Z_SEL = PROC_ZDATA
```

NOTE: SEE NOTE IN FIG. 3A

FIG. 3B

| |
|---|
| XLATN_XADDR = *PC |
| XA_SEL = XLATN_XADDR |
| AX_SEL = X |
| XLATN_YMASK = 0X02 |
| AY_SEL = XLATN_YMASK |
| ALU_CMD = ADD |
| XLATN_ZADDR = *PC |
| ZA_SEL = XLATN_ZADDR |
| Z_SEL = AZ |
| XLATN_XADDR = DEST_ADDR |
| XA_SEL = XLATN_XADDR |
| AX_SEL = X |
| PROC_AYDATA = IMM |
| AY_SEL = PROC_AYDATA |
| ALU_CMD = ADD |
| XLATN_ZADDR = DEST_ADDR |
| ZA_SEL = XLATN_ZADDR |
| Z_SEL = AZ |
| XLATN_XADDR = *(PSN.C) |
| XA_SEL = XLATN_XADDR |
| XLATN_ZADDR = *BD |
| ZA_SEL = XLATN_ZADDR |
| Z_SEL = X |
| AX_SEL = AZ |
| XLATN_YMASK = 0X01 |
| AY_SEL = XLATN_YMASK |
| ALU_CMD = ADD |
| XLATN_ZADDL = DEST_ADDR |
| ZA_SEL = XLATN_ZADDR |
| Z_SEL = AZ |

NOTE: SEE NOTE IN FIG. 3A

FIG. 6

PROCESSOR HAVING A DATAPATH AND CONTROL LOGIC CONSTITUTED WITH BASIS EXECUTION BLOCKS

RELATED APPLICATIONS

The present invention is a continuation of Ser. No. 09/120,041, filed Jul. 21, 1998, now U.S. Pat. No. 6,216,218, which is a continuation-in-part application to application Ser. No. 08/963,387, filed Nov. 3, 1997, now U.S. Pat. No. 5,940,626, entitled "A Processor Having An ISA Implemented With Hierarchically Organized Primitive Operations", and application Ser. No. 08/963,345, filed Nov. 03, 1997, now U.S. Pat. No. 6,016,539, entitled "Datapath Control Logic For A Processor Having An ISA Implemented With Hierarchically Organized Primitive Operations". These applications, through incorporation by reference, include application Ser. No. 08/963,389, now U.S. Pat. No. 6,067,601, entitled "Cache Memory Based Instruction Execution", application Ser. No. 08/963,391, now U.S. Pat. No. 6,178,482, entitled "Virtual Register Set", and application Ser. No. 08/963,346, now U.S. Pat. No. 5,923,894, entitled "Adapatable I/O Pin Control". All five applications were filed on Nov. 3, 1997, and have identical inventorship as well as identical assignee as the present invention.

BACKGROUND OF THE INVENTION

1. Field of the Invention

The present invention relates to the field of processors. More specifically, the present invention relates to the subject matter of constituting the datapath and its control logic of a processor.

2. Background Information

Every processor has a datapath and a corresponding control logic. The term datapath as used herein is a collective reference to the processor elements employed in performing arithmetic logic operations, whereas the term control logic as used herein is a collective reference to the processor elements employed in controlling the datapath to effectuate the desired arithmetic logic operations. The term processor as used herein is intended to include microcontrollers (MCU), digital signal processors (DSP), general purpose microprocessors ($\mu$P), and the like. In the case of prior art processors, datapaths typically include arithmetic logic unit (s) (ALU), operand register or registers, control registers, and so forth. These prior art datapaths are typically controlled by control logic implemented in either hardwired logic or through microprogramming (also referred to as microcode or firmware).

The operand register(s) of a datapath varies (vary) from an accumulator approach, a stack approach or a register file approach. In the case of the stack based approach, one of the source as well as the destination operands of an instruction are implicitly defined to be located at the top of the stack, whereas, in the case of the accumulator based approach, one of the source as well as the destination operand of an instruction are implicitly defined to be located in the accumulator. Typically, the other source operand is located in a register. In the case of the register set based approach, the source and the destination operands of an instruction are either located in registers or in memory locations. While registers are specified by their identifiers, memory locations, whether cached or not, are specified by either physical or virtual addresses, depending on the manner in which memory is managed.

While the stack based approach enjoys the advantage of providing a simple model for expression evaluation, and short instruction, the approach suffers from at least the disadvantages of forcing all the operands onto the stack, and yet not being able to randomly access the pushed down operands in the stack, resulting in inefficient coding. As to the accumulator approach, while it minimizes the internal states of a processor, and provides for short instructions, it also suffers from at least the disadvantage of very high memory traffic, since the accumulator is the only temporary storage. The register based approach has the advantage of being the most general model for code generation, however, because of the access and related circuitry required to support a register, most prior art register based processors tend to provide only a limited number of registers, resulting in a relatively small working set. The disadvantage becomes especially limiting for heavily pipelined super-scalar processors.

With respect to the control logic, in the case of a hardwired implementation, typically one or more random control logic block are employed to generate the proper control signals to be output to control the datapath. The proper control signal to be output at a particular clock cycle is selected based on the current state of the processor, feedback from the datapath and the opcode of the next instruction to be executed. In the case of microprogrammed control logic, typically microinstructions are employed to specify the control signals for the datapath. The microinstructions are stored e.g. in a read-only-memory (ROM), and selected for output in each clock cycle, based on the current microinstruction program counter (PC). At each clock cycle, the microinstruction PC is modified based on a newly computed next microinstruction PC, the current microinstruction output (specifying in part the next microinstruction to be output), feedback from the datapath, and/or the opcode of the next instruction to be executed (also referred to as the next macroinstruction).

As a result, a processor designer has to operate and optimize the processor being designed at a pretty low level, which translates into complexity and low productivity. Furthermore, the processor designer has to employ different methodologies for the datapath and its control logic, which further compounds the complexity and low productivity problem. Thus, a more effective approach to designing and implementing a processor's datapath and its control logic without some of the prior art disadvantages is desired.

SUMMARY OF THE INVENTION

A processor is provided with a datapath and control logic, where the datapath and/or the control logic are constituted with basis execution blocks (BEB). Each BEB includes an addressable storage and an arithmetic logic unit (ALU) selectably coupled to each other in a manner that allows instruction execution and/or control decisions to be effectuated through storage read/write operations against the addressable storage and ALU operations performed by the ALU.

In one embodiment, the addressable storage of each BEB is a cache memory. In another embodiment, the read, write and ALU operations are hierarchically organized.

BRIEF DESCRIPTION OF DRAWINGS

The present invention will be described by way of exemplary embodiments, but not limitations, illustrated in the accompanying drawings in which like references denote similar elements, and in which:

FIGS. 3a–3c illustrate various exemplary combinations of POP;

FIG. 6 illustrates various exemplary combinations of POP for performing dynamic decision;

DETAILED DESCRIPTION OF THE INVENTION

In the following description, various aspects of the present invention will be described. Those skilled in the art will also appreciate that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Figure 1:
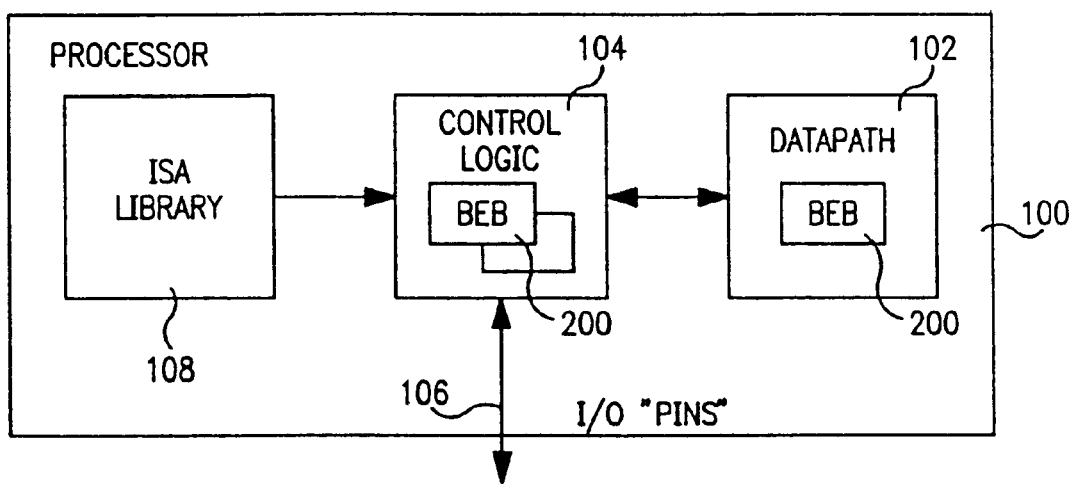
FIG. 1 illustrates one embodiment of a processor incorporated with the teachings of the present invention.

Referring now to FIG. 1, wherein a block diagram illustrating one embodiment of a processor incorporated with the teachings of the present invention is shown. Processor 100 includes datapath 102, control logic 104 and ISA library 108 coupled to each other as shown. ISA library 108 includes native instructions of processor 100 organized to implement instructions of a number of instruction set architectures (ISA) of non-native or guest architectures, e.g. Motorola's M680x0 and Texas Instrument's TMS320 instructions. (Note that the unorganized native instructions are the instructions of the native or host ISA. For clarity, hereinafter, the native instructions will be referred to as primitive operations or POP.) Datapath 102 and control logic 104 perform their conventional functions of executing instructions of an ISA, except datapath 102 and control logic 104 are capable of effectuating execution of instructions of a non-native or guest ISA by executing the POPs in an organized manner, and datapath 102 and control logic 104 are constituted in a novel approach, i.e. using basis execution blocks (BEB) 200 in accordance with the present invention. As an introduction, each BEB 200 includes an addressable storage and an ALU directly coupled to each other to allow operands to be directly supplied from the addressable storage to the ALU, and directly written back into the addressable storage from the ALU. The control decisions as well as the instruction executions are effectuated through read and write operations against the addressable storage of the BEBs 200 and ALU operations performed by the ALUs of the BEBs 200. One embodiment of POP organization will be described in more detail below, after the manner in which datapath 102 and control logic 104 are constituted using BEB 200 is first described.

Skipping now first to FIGS. 7–13, wherein seven block diagrams illustrating the constitution of datapath 102 and control logic 104 in accordance with the present invention, and BEB 200 are shown. For ease of understanding, each of datapath 102 and a number of functional units of control logic 104 will be described as being constituted with one BEB 200. However, that is not to be construed as limiting on the present invention, datapath 102 as well as each of these functional units of control logic 104 may be constituted with one or more BEB 200.

Figure 7:
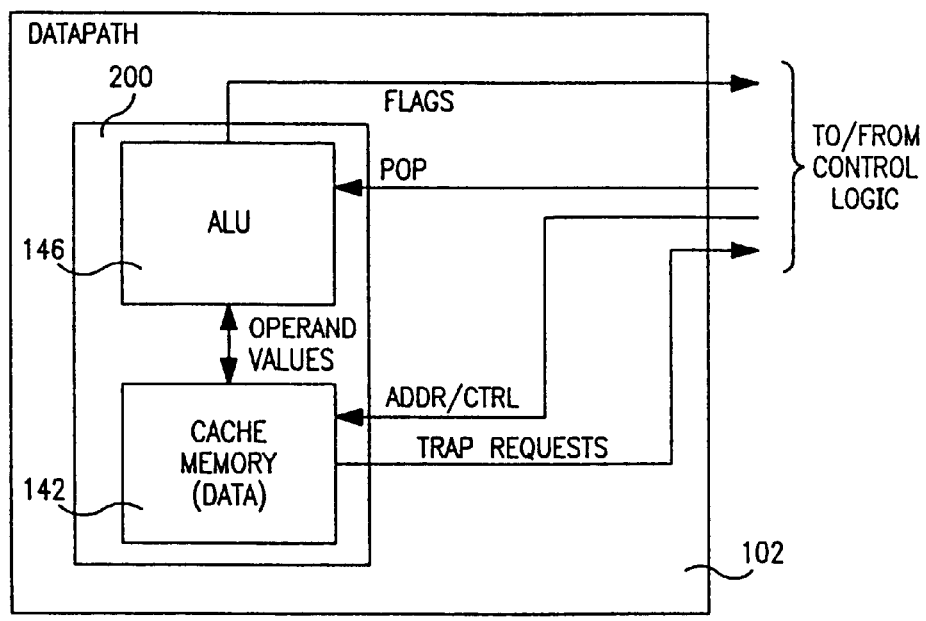
FIGS. 7–8 illustrate one embodiment each of the datapath and the control logic respectively.

FIG. 7 illustrates an overview of one embodiment of datapath 102. For the illustrated embodiment, datapath 102 is constituted with one BEB 200, which includes cache memory 142 and ALU 146, coupled to each other as shown. As alluded to earlier, cache memory 142 of datapath 102 is employed by control logic 104 to directly supply and accept operand values to and from ALU 146 of datapath 102. ALU 146 is employed to perform ALU operations on operand values supplied by cache memory 142. The resulting values are directly stored back into cache memory 142.

More specifically, during operation, control logic 104 selectively provides control and location information of operand values to ALU 146 and cache memory 142 of datapath 102 respectively. In response, cache memory 142 outputs the appropriate operand values for ALU 146, which in turn operates on the operand values output by cache memory 142. The resulting operand values are stored back into cache memory 142. Additionally, ALU 146 is designed to provide control logic 104 with various system flag values, such as carry and zero flags, and cache memory 142 is designed to issue trap requests to control logic 104 as a result of data values being stored into certain pre-selected cache locations, such as cache locations that function as an accumulator, a program counter and so forth. In one embodiment, the word lines of cache memory 142 are employed to issue the trap requests, by providing offsets into a trap vector table. The offsets are derived through word line mappings.

Figure 8:
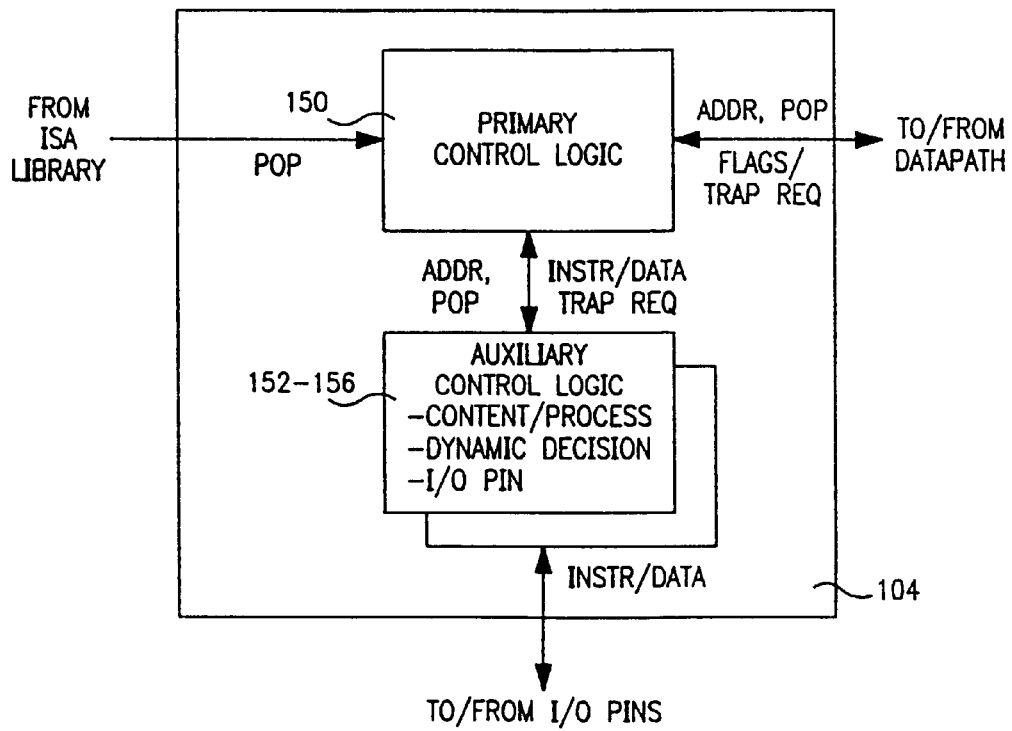

FIG. 8 illustrates one embodiment of control logic 104. For the illustrated embodiment, control logic 104 includes primary control unit (PCU) 150 and a number of auxiliary control units (ACU) 152–156. Specifically, for the illustrated embodiment, ACU 152–156 include a context/process ACU 152, a dynamic decision ACU 154, and an input/output (I/O) pin ACU 156. PCU 150 selectively controls datapath 102 to effectuate instruction execution with the assistance of ACU 152–156. Context/process ACU 152 is employed to assist PCU 150 in determining the appropriate state transitions for various contexts and processes. For the illustrated embodiment, ACU 152 maintains various context control blocks (CCB) and process control blocks (PCB) for the various contexts and processes. Dynamic decision ACU 154 is employed to assist PCU 150 in processing a number of dynamic decision variables, such as a branch decision variable. For the illustrated embodiment, the dynamic decision variables are maintained in the dynamic decision ACU 154. I/O pin ACU 156 is employed to assist PCU 150 in effectuating data input/output via the I/O pins 106 respectively. In alternate embodiments, more or less ACU may be employed.

Figure 9:
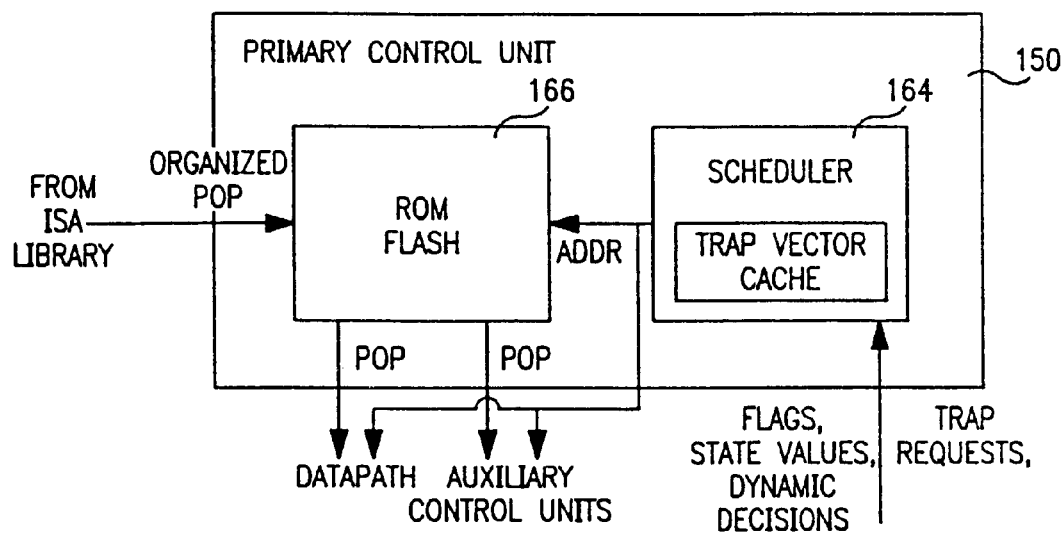
FIGS. 9–12 illustrate one embodiment each of a primary control unit, a context/process auxiliary control unit, a dynamic decision auxiliary control unit and an I/O pin auxiliary control unit respectively.

FIG. 9 illustrates one embodiment of PCU 150 in more detail. For the illustrated embodiment, PCU 150 includes scheduler 164 and memory 166 coupled to each other as shown. Scheduler 164 is employed to schedule the execution of the organized POP. In addition to scheduling logic, which may be implemented employing any one of a number of approaches known in the art, scheduler 164 includes a trap vector table of trap handler addresses. Additionally, scheduler 164 is configured with the information identifying how many and which ISA's POP are to be retrieved from ISA library 108. The configuration may be achieved in any one of a number of approaches known in the art. Memory 166 is used to pre-stage the implementing organized POP of an ISA. In one embodiment, memory 166 is partitioned into regions for storing the various implementing organized POP in accordance with their functions, i.e. implementing instructions, context/process management, dynamic decision making, trap handling, etc. Scheduler 164 and memory 166 may be implemented with any one of a number of circuitry known in the art.

During operation, responsive to instructions of the processes, e.g. user instruction streams, various organized POP are scheduled for execution. Responsive to addresses supplied by scheduler 164, memory 166 outputs the various organized POP to selected ones of datapath 102 and auxiliary control units 152–156. Scheduler 164 formulates the appropriate addresses to supply to memory 166 using the base and offset addresses maintained in the CCB and PCB of the various contexts and processes (to be described in more detail below). As execution progresses, when necessary ACU 152–154 assist PCU 150 to examine execution conditions that govern the conditional execution of the organized POP. Similarly, when necessary, scheduler 164 causes appropriate ones of organized POP to be output from memory 166 for context/process ACU 152 and dynamic decision ACU 154 to assist in determining appropriate state transitions and dynamic decisions respectively. Likewise, responsive to trap requests made to control logic 102, scheduler 164 using the trap handler address information maintained in trap vector table, causes appropriate ones of the organized POP of the trap handlers to be output to selected ones of datapath 102 and ACU 152–154 for execution. In particular, selected ones of the trap handlers assist in maintaining the control information in the PCB for successive scheduling of the organized POP. Additionally, as execution progresses, responsive to I/O trap requests, scheduler 164 causes appropriate ones of the organized POP to be output to I/O pin auxiliary ACU 156 to assist in effectuating data input/output via the I/O pins.

Figure 10:
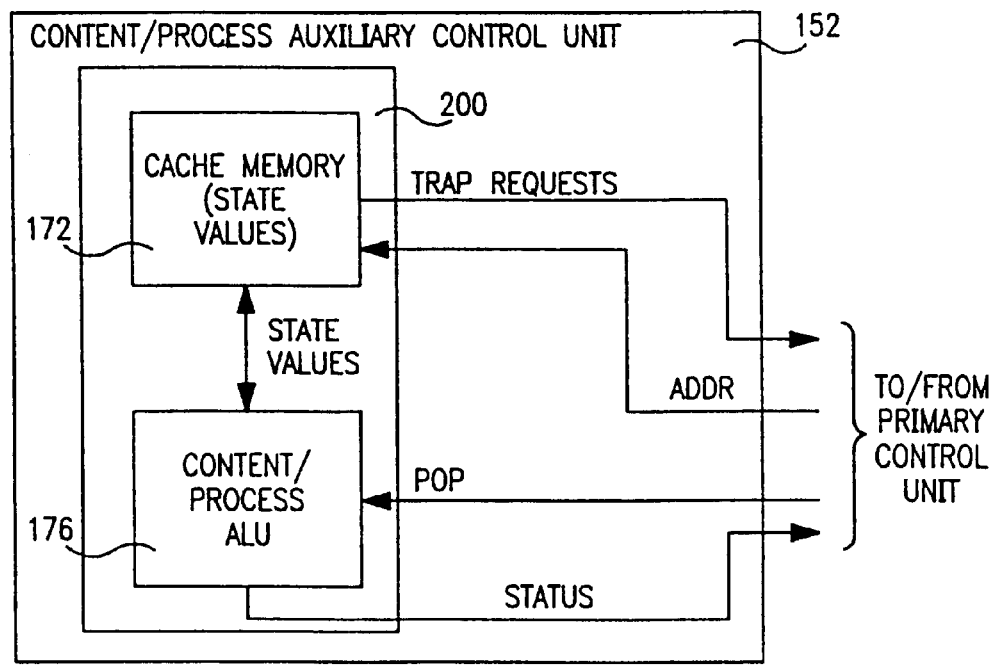

FIG. 10 illustrates one embodiment of context/process ACU 152 in more detail. For the illustrated embodiment, context/process ACU 152 is constituted with one BEB 200, which includes cache memory 172 and ALU 176, coupled to each other as shown. As described earlier, cache memory 172 of context/process ACU 152 is employed by control logic 104 to store CCB and PCB of various contexts and processes, and output the various control variables of CCB and PCB for processing by ALU 176 of context/process ACU 152. ALU 176 is employed to execute the organized POP output using operand values supplied by cache memory 172. Cache memory 172 may be implemented in like manner as cache memory 142 of datapath 102. In one embodiment, the earlier described cache memory 142 of datapath 102 and cache memory 172 are implemented using the same physical structure.

During operation, control logic 104 selectively provides appropriate ones of the organized POP and location information of control variable/state values to ALU 176 and cache memory 142 of context/process ACU 152 respectively. In response, cache memory 172 outputs the appropriate control variable/state values for ALU 176, which in turn executes the POP, and process the control variable/state values output by cache memory 172. The resulting control variable/state values are stored back into cache memory 172. Additionally, ALU 176 is designed to provide control logic 104 with the states of the various executing POP organizations, and cache memory 172 is designed to issue trap requests to control logic 104. The trap requests are issued as a result of state values being stored into certain locations of cache memory 172, such as the cache locations employed to store the reset bits and so forth. In one embodiment, the word lines of cache memory 172 are employed to issue the trap requests, by providing offsets into the above described trap vector table. The offsets are derived through word line mappings.

Figure 11:
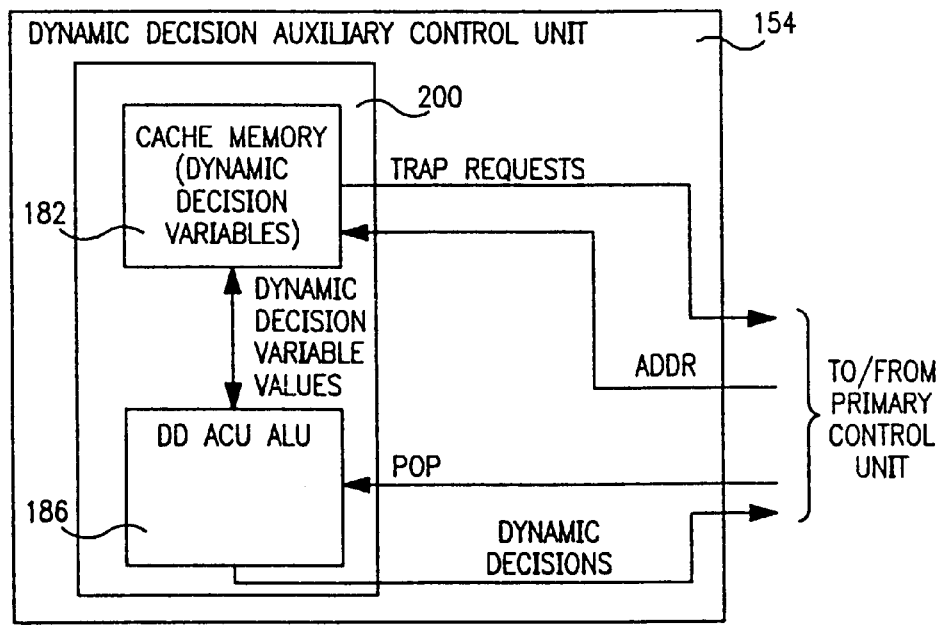

FIG. 11 illustrates one embodiment of dynamic decision ACU 154 in more detail. For the illustrated embodiment, dynamic decision ACU 154 is constituted with one BEB 200, which includes cache memory 182 and ALU 186, coupled to each other as shown. Cache memory 182 of dynamic decision ACU 154 is employed by control logic 104 to store and output dynamic decision variable values for ALU 186 of dynamic decision ACU 154. ALU 186 is employed to execute the organized POP, using dynamic decision variable values supplied by cache memory 182. Cache memory 182 may be implemented in like manner as cache memory 142 of datapath 102. In one embodiment, the earlier described cache memory 142 of datapath 102, cache memory 172 and cache memory 182 are implemented using the same physical structure.

During operation, control logic 104 selectively provides appropriate ones of the organized POP and location information of dynamic decision variable values to ALU 186 and cache memory 182 of dynamic decision ACU 154 respectively. In response, cache memory 182 outputs the appropriate dynamic decision variable values for ALU 186, which in turn executes the organized POP, and processes the dynamic decision variable values output by cache memory 182. The resulting dynamic decision variable values are stored back into cache memory 182. Additionally, ALU 186 is designed to provide control logic 104 with the dynamic decisions determined, and cache memory 182 is designed to issue trap requests to control logic 104, such as the cache location employed to store the power control bits and so forth. The trap requests are issued as a result of dynamic decision variable values being stored into certain locations of cache memory 182. In one embodiment, the word lines of cache memory 182 are employed to issue the trap requests, by providing offsets into the above described trap vector table. The offsets are derived through word line mappings.

Figure 12:
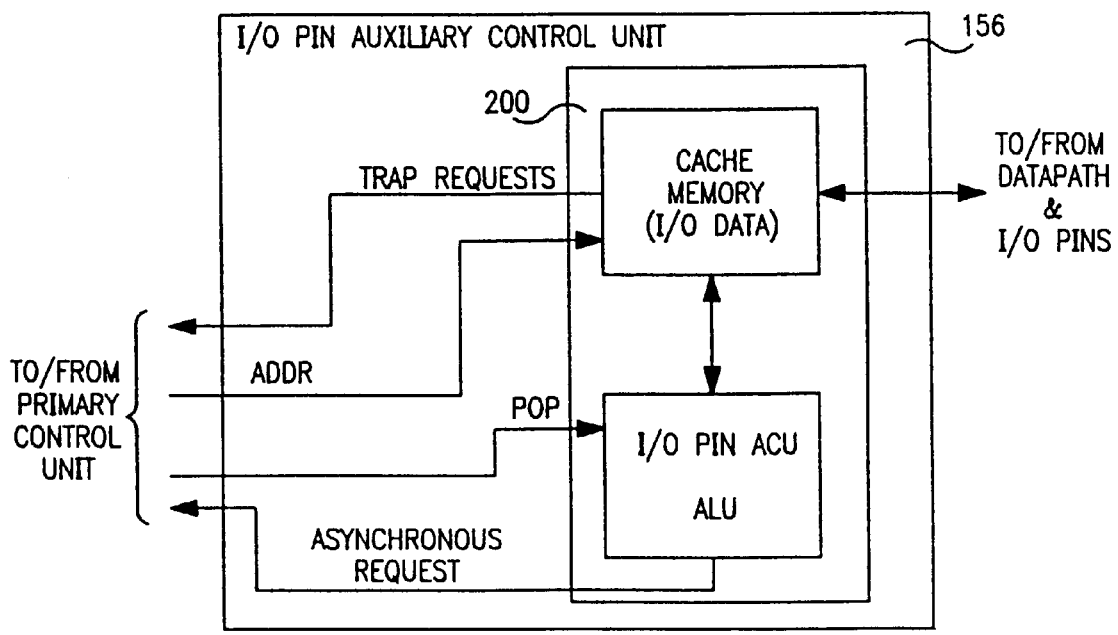

FIG. 12 illustrates one embodiment of I/O pin ACU 156 in more detail. For the illustrated embodiment, I/O ACU 154 is also similarly constituted as the other auxiliary ACU employing one BEB 200, which includes cache memory 192 and ALU 196, coupled to each other as shown. Cache memory 192 of I/O pin ACU 156 is employed by control logic 104 to accept data input values from, and drive data output values to I/O pins 106. ALU 196 of I/O pin ACU 156 is employed to execute the organized POP, and causes cache memory 192 to accept or drive data input/output values. Cache memory 192 may be implemented in like manner as cache memory 142 of datapath 102. In one embodiment, the earlier described cache memory 142 of datapath 102, cache memory 17Z cache memory 182 and cache memory 192 are all implemented using the same physical structure.

During operation, control logic 104 selectively provides appropriate ones of the organized POP and location information of data input/output values to ALU 196 and cache memory 192 of I/O pin ACU 156 respectively. In response, ALU 196 causes cache memory 192 to accept data input values from or drive data output values to I/O pins 106. Alternatively, ALU 196 causes cache memory 192 to accept data output values from cache memory 142 or ALU 146 of datapath 102. Additionally, ALU 196 is designed to provide control logic 104 with asynchronous requests, and cache memory 192 is designed to issue trap requests to control logic 104. The trap requests are issued as a result of data input/output values being stored into certain locations of cache memory 192. In one embodiment, the word lines of cache memory 192 are employed to issue the trap requests, by providing offsets into the above described trap vector table. The offsets are derived through word line mappings. (I/O pin control is the subject matter of copending U.S. Patent Application, entitled "Adaptable I/O Pin Control" identified above.)

Figure 13:
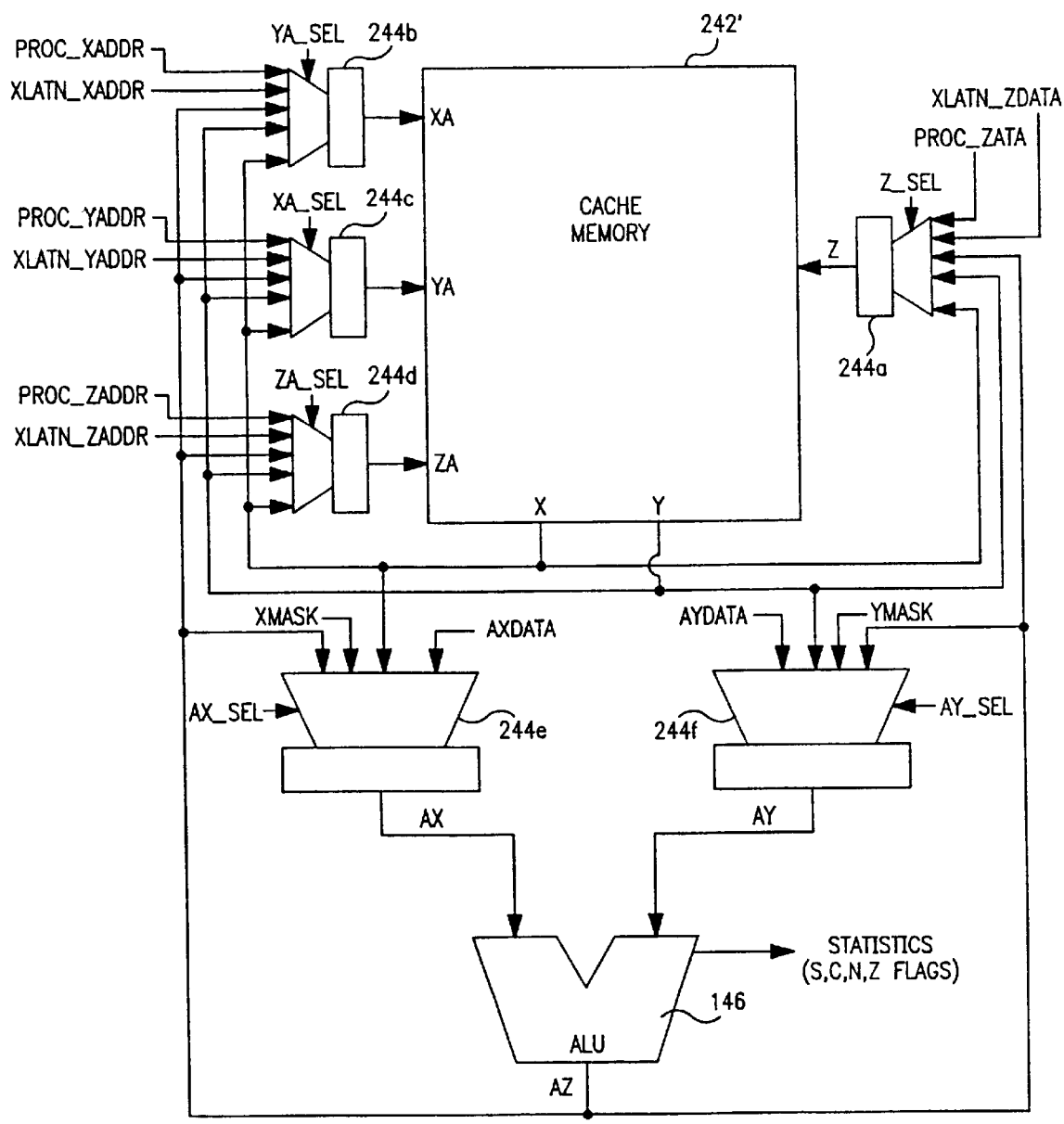
FIG. 13 illustrates one embodiment of the basis execution block of the present invention.

Referring now to FIG. 13, wherein a block diagram illustrating one embodiment of BEB 200 is shown. For the illustrated embodiment, BEB 200 includes cache memory 242 and ALU 246 selectably coupled to each other, to allow operands to be directly supplied to ALU 246 and stored back into cache memory 242 as described to earlier. The selectable coupling is provided by selector-buffer combinations 244a–244f. Selector-buffer combination 244a enables dynamic selection of the write data (Z) from the current executing process (Proc_Zdata), the ISA library (Xlatn_Zdata), the X and Y output ports of cache memory 242 itself, and the output port (AZ) of ALU 246. Selector-buffer combination 244d enables dynamic selection of the write address (Zaddr) from the current executing process (Proc_Zaddr), the ISA library (Xlatn_Zaddr), the X and Y output ports of cache memory 242 itself, and the output port (AZ) of ALU 246. Similarly, each of selector-buffer combinations 244b–244c enables dynamic selection of a read address (Xaddr or Yaddr) from the current executing process (Proc_Xaddr or Proc_Yaddr), the ISA library (Xlatn_Xaddr or Xlatn_Yaddr), the X and Y output ports of cache memory 242 itself, and the output port (AZ) of ALU 246. Finally each of selector-buffer combinations 244e–244f enables dynamic selection of an ALU input (AX or AY) from the current executing process (Proc_AXdata or Proc_AYdata), pre-configured asks from the ISA library (Xlatn_Xmask or Xlatn_Ymask), the output ports (X or Y) of cache memory 242 itself, and the output port (AZ) of ALU 246. The buffer depth of each selector-buffer combination 244a–244f is designed to match the execution pipeline latency of a particular implementation.

In other words, in addition to being advantageously cache memory based, BEB 200 of the present invention is provided with a very flexible input selection structure, allowing either immediates and/or previously computed address/operand values, as well as address/operand values injected by the executing process and/or the non-native to native ISA translation process to be used as X, Y and/or Z address and/or data. As a result, BEB 200 is sufficiently flexible to enable most control decisions as well as instruction executions to be effectuated, through read/write operations against cache memory 242 and ALU operations performed by ALU 246; that is, allowing virtually all control decisions and instruction executions to be implemented through memory read, write and ALU operations. Thus, under the present invention, a processor designer will be able to advantageously design and optimize both the datapath and its control logic using a single unified technology, ie. memory read, write and ALU operations directed towards a basis structure, to reduce processor design complexity and increase productivity.

While BEB 200 has been described with the embodiment illustrated in FIG. 13, it should be noted that the present invention may be practiced with a BEB having more or less selectability. Cache memory based instruction execution and virtual register set are the subject matters of the above identified co-pending applications that are incorporated as part of the parent application. A multiprocessing embodiment of cache memory 242 is the subject matter of copending application Ser. No. 09/120,048, entitled "Variable Set Combination Cache Memory Based Multiprocessing", filed Jul. 21, 1998, also having common inventorship and assignee with the present invention, which is hereby incorporated by reference.

Figure 3C:
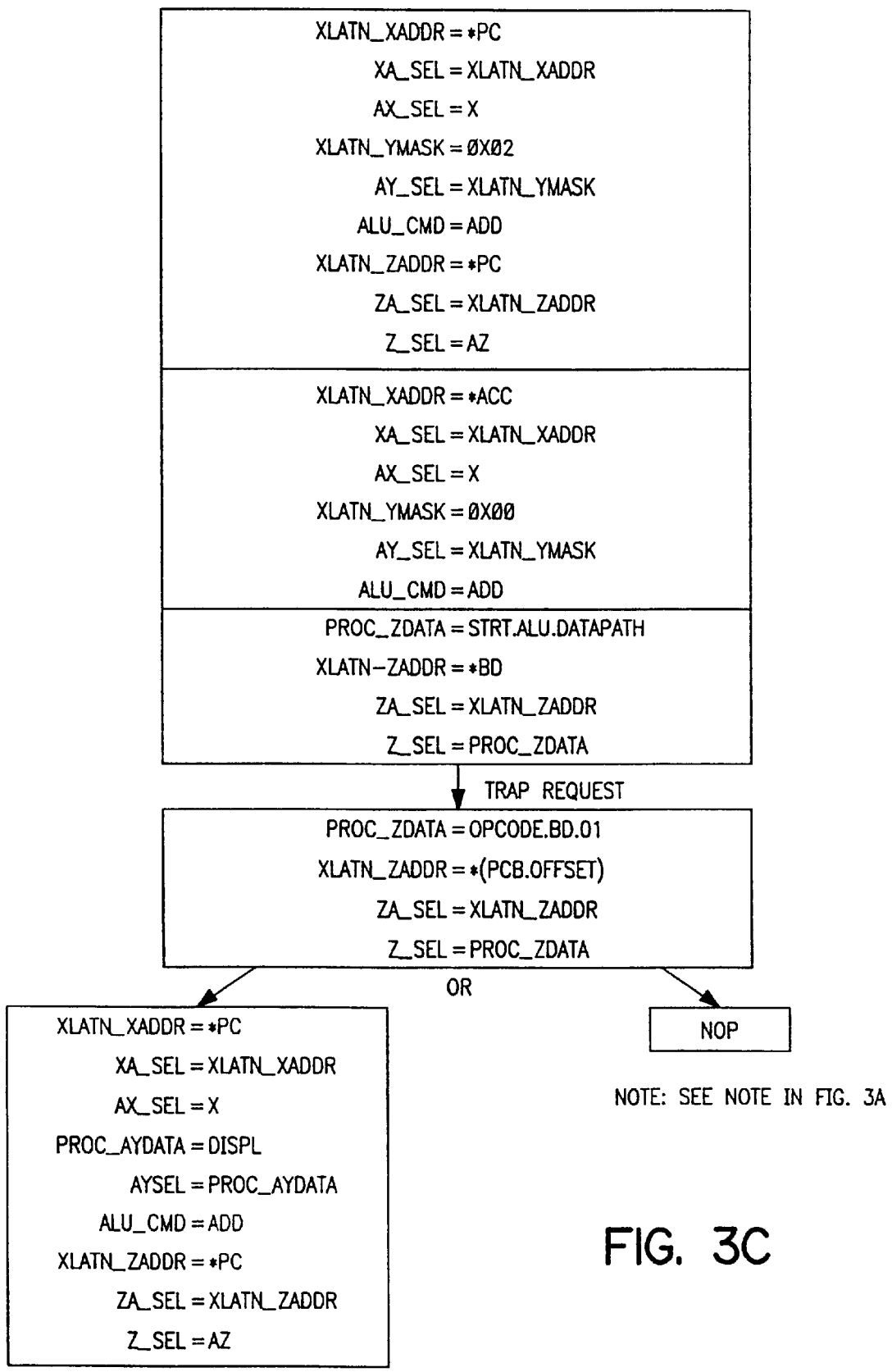

Referring now to FIGS. 3a–3c, wherein a number of exemplary employment of memory read, write and ALU operation combinations to effectuate execution of instructions and control decisions are shown. Unless otherwise specified, the memory read, write operations are directed towards cache memory 142, and ALU operations are performed by ALU 146 of BEB 200 of datapath 102.

FIG. 3a illustrates two exemplary combinations of read/write/ALU operations to effectuate execution of an ADD instruction, adding an immediate to a destination register. To effectuate the ADD instruction, the macro instruction pointer (pc) is incremented by two bytes (the instruction size of the exemplary ADD instruction), and an immediate extracted from the instruction is added to the content of a specified destination register (dest_addr). The first exemplary combination includes {Xlatn_Xaddr=*pc, Xa_Sel=Xlatn_Xaddr, AX_Sel=X, Xlatn_Ymask=0x02, AY_Sel=Xlatn_Ymask, ALU_Cmd=Add, Xlatn_Zaddr=*pc, Za_sel=Xlatn_Zaddr, and Z_Sel =AZ}, whereas the second exemplary combination includes {Xlatn_Xaddr=dest_addr, Xa_Sel=Xlatn_Xaddr, AX_Sel=X, Proc_AYdata=Imm, AY_Sel=Proc_AYdata, ALU_Cmd=Add, Xlatn_Zaddr=dest_addr, Za_sel =Xlatn_Zaddr, and Z_Sel=AZ}. While not explicitly specified, each of the remaining unused elements of BEB 200 are provided with a NOP POP.

For the first exemplary combination, Xlatn_Xaddr=*pc and Xa_Sel=Xlatn_Xaddr cause Xaddr to be set to the address of the storage location used to store the program counter (pc), thereby causing the current PC to be output on the X port. AX_Sel=X causes the current PC output on the X port to be selected as the X-input of the ALU. Xlatn_Ymask=0x02 and AY_Sel=Xlatn_Ymask causes the ALU to select the 0x02 mask from the ISA library as its Y-input. ALU_Cmd=Add causes the ALU to add the X and Y inputs, i.e. adding the 0x02 mask to the current PC. Finally, Xlatn_Zaddr=*pc, Za_sel=Xlatn_Zaddr and Z_Sel=AZ cause the addition result, i.e. the incremented PC, to be written back to the storage location used for storing PC.

For the second exemplary combination, Xlatn_Xaddr=dest_addr and Xa_Sel=Xlatn_Xaddr cause the current content of the storage location used as the destination register to be output on the X port. AX_Sel=X causes the current content of the destination register output on the Xport to be selected as the ALU's X-input Proc_AYdata=Imm and AY Sel=Proc_AYdata causes the ALU to select the process specific immediate as its Y-input. ALU_Cmd=Add causes the ALU to add its X and Y inputs together, i.e. adding the immediate to the current content of the destination register. Xlatn_Zaddr=Dest_Addr, Za_sel=Xlatn_Zaddr and Z_Sel =AZ cause the addition result to be written back to the storage location used as the destination register.

Thus, it can be seen that when executed, the first exemplary combination of read/write/ALU operations can effectuate increment of a PC, and the second exemplary combination of read/write/ALU operations can effectuate adding an immediate to a destination register.

FIG. 3b illustrates four exemplary combinations of read/write/ALU operations for effectuating execution of a long call (LCALL) instruction in two cycles. In a LCALL instruction, the PC is incremented by three bytes (the instruction size of the exemplary LCALL instruction), to point to the first instruction to be executed upon returning from the call. The incremented PC is then saved onto a stack. Next, the stack pointer is updated, and the target address of the call, extracted from the instruction, is copied into the PC.

The first exemplary combination includes {Xlatn_Xaddr=*pc, Xa_Sel =Xlatn_Xaddr, AX_Sel=X, Xlatn_Ymask=0x03, AY_Sel=Xlatn_Ymask, ALU_Cmd=Add, Xlatn_Zaddr=*pc, Za_sel=Xlatn_Zaddr, and Z_Sel=AZ}, whereas the second exemplary combination includes {Xlatn_Xaddr=*stack, Xa_Sel=Xlatn_Xaddr, AX_Sel=X, Xlatn_Yaddr=*pc, YA_Sel=Xlatn_Yaddr, Xlatn_Ymask=0x02, AY_Sel=Xlatn_Ymask, ALU_Cmd=Add, Za_sel=AZ, and Z_Sel=Y}. The third exemplary combination includes {Xlatn_Xaddr=*stack, Xa_Sel=Xlatn_Xaddr, AX_Sel=X, Xlatn_Ymask=0x02, AY_Sel=Xlatn_Ymask, ALU_Cmd=Add, Xlatn_Zaddr=*stack, Za_sel=Xlatn_Zaddr, and Z_Sel=AZ}, whereas the fourth exemplary combination includes {Proc_Zdata=Imm, Xlatn_Zaddr=*pc, Za_sel=Xlatn_Zaddr, and Z_Sel=Proc_ZData}. Similarly, each of the "unused" elements of BEB 200 is provided with a NOP POP.

Except for the employment of a 0x03 mask, the first exemplary combination is the same PC increment combination illustrated in FIG. 3a. For the second exemplary combination, the meaning of POPs Xlatn_Xaddr=*stack, XA_Sel=Xlatn_Xaddr are similar to the earlier described POPs for "dest_addr", in that they cause the current content of the storage location used to store the stack pointer to be output on the X port. AX_Sel=X causes the ALU to select the stack pointer as its X input. The meaning of POPs Xlatn_Yaddr=*pc and YA_Sel are also similar, in that they cause the current incremented PC to be output on the Y port. The meaning of POPs Xlatn_Ymask=0x02, AY_Sel=Xlatn_Ymask are also similar, in that it causes the ALU to select the 0x02 mask from the ISA library as its Y input. ALU_Cmd=Add causes the ALU to add its X and Y inputs, i.e. adding the 0x02 mask to the stack pointer. Finally, ZA_Sel=AZ and Z_Sel=Y cause the incremented PC output on the Yport to be saved onto the stack, a storage location pointed to by the incremented stack pointer.

Thus, collectively the first and second exemplary combinations of read/write/ALU operations can be used to effectuate the first stage execution of the LCALL instruction.

For the third exemplary combination, the meaning of POPs Xlatn_Xaddr=*stack, XA_Sel=Xlatn_Xaddr, AX_Sel=X, Xlatn_Ymask=0x02, AY_Sel=Xlatn_Ymask, and ALU_Cmd=Add have all been described earlier. Finally, Xlatn_Zaddr=*stack, ZA_Sel=Xlatn_Zaddr and Z_Sel=AZ cause the stored stack pointer to be updated with a new value. For the fourth exemplary combination, POPs Proc_Zdata=Imm (which is the target address extracted from the LCALL Instruction), Xlatn_Zaddr=*pc, ZA_Sel=Xlatn_Zaddr and Z_Sel=Proc_Zdata cause the extracted target address to be copied into the storage location storing the PC.

Thus, collectively the third and fourth exemplary combinations of read/write/ALU operations can be used to effectuate the second stage execution of the LCALL instruction. It should be noted that the above description of employing the four exemplary combinations to effectuate the LCALL instruction in two stages is strictly illustrative for one exemplary ISA. For another ISA, execution of the LCALL instruction may be effectuated in more or less stages. It should also be noted that for any multi-stage implementation, depending on the ISA, it might be necessary to save and restore intermediate values between stages. Such saving and restoring were not illustrated to facilitate easier understanding of the key concepts being described.

FIG. 3c illustrates another five exemplary combinations of POP for implementing a Jump If Accumulator Zero (JZ) instruction. The JZ instruction determines if the accumulator is zero. If so, execution continues at a target address using a displacement, based on the updated PC value, that is specified in the instruction; else execution continues with the next instruction.

The first exemplary combination includes {Xlatn_Xaddr=*pc, Xa_Sel=Xlatn_Xaddr, AX_Sel=X, Xlatn_Ymask=0x02, AY_Sel=Xlatn_Ymask, ALU_Cmd=Add, Xlatn_Zaddr=*pc, Za_sel=Xlatn_Zaddr, and Z_Sel=AZ}, whereas the second exemplary combination includes {Xlatn_Xaddr=*acc, Xa_Sel Xlatn_Xaddr, AX_Sel=X, Xlatn_Ymask=0x00, AY_Sel=Xlatn_Ymask and ALU_Cmd=Add}. The third exemplary combination includes {Proc_ZData=StatALU.Datapath, Xlatn_Zaddr=*BD, Za_Sel=Xlatn_Zaddr, Z_Sel=Proc_ZData}, whereas the fourth exemplary combination includes {Proc_Zdata=Opcode, BD, 01, Xlatn_Zaddr=*(PCB.Offset), Za_Sel=Xlatn_Zaddr, and Z_Sel=Proc_ZData}. The fifth exemplary combination includes {Xlatn_Xaddr=*pc, Xa_Sel=Xlatn_Xaddr, AX_Sel=X, AY_Data=displ, AY_Sel=AY_Data, ALU_Cmd=Add, Xlatn_Zaddr=*pc, Za_sel=Xlatn_Zaddr, and Z_Sel=AZ}, whereas the sixth exemplary combination includes simply a collection of NOPs. Similarly, as in the other exemplary combinations, each of the unused elements of BEB 200 is provided with a NOP POP.

The first exemplary combination is the same PC increment combination described earlier. For the second exemplary combination, Xlatn_Xaddr=*acc and Xa_Sel=Xlatn_Xaddr cause the content of the storage location used to store the accumulator value to be output on the X port. AX_Sel=X causes the ALU to select the X port output as its X input. Xlatn_Ymask=0x00 and AY_Sel=Xlatn_Ymask causes the ALU to select the 0x00 mask from the ISA library as its Y input. ALU_Cmd=Add causes the ALU to add its X and Y inputs, i.e. adding the 0x00 mask to the accumulator content.

For the third exemplary combination, Proc_ZData=Stat.ALU.Datapath, Xlatn_Zaddr=*BD, Za_Sel=Xlatn_Zaddr and Z_Sel=Proc_Zdata cause the statistics of ALU 146 of datapath 102 (which includes the zero flag) to be stored into a storage location of cache memory 182 of BEB 200 of dynamic decision ACU 154 used to store the branch decision variable BD (which is a storage location designed to generate a trap request whenever a value is written into it).

Thus, collectively the first, second and third exemplary combinations of read/write/ALU operations can be used to effectuate the first stage execution of the JZ instruction.

For the fourth exemplary combination, Proc_Zdata Opcode, BD, 01, Xlatn_Zaddr=*(PCB.Offset), Za_Sel=Xlatn_Zaddr, and Z_Sel=Proc_Zdata cause the concatenated value of "opcode, BD, 01" to be stored in a storage location of cache memory 172 of BEB 200 of context/process ACU 152 of control logic 104 used to hold the offset address (PCB.offset) employed to locate and dispatch the next combination of read/write/ALU operations for use to control datapath 102. The offset address in general is a function of the opcode of an instruction, plus a number of extended bits. In this case, the extended bits include the branch decision variable BD, to allow the storage location of the next combination of POP to be dynamically determined.

For the fifth exemplary combination, Xlatn Xaddr=*pc, Xa_Sel=Xlatn_Xaddr, AX_Sel=X, AY_Data=displ, AY_Sel=AY Data, ALU_Cmd Add, Xlatn_Zaddr=*pc, Za_sel=Xlatn_Zaddr, and Z_Sel=AZ cause the displacement (displ) to be stored into the storage location used to store the PC. The sixth exemplary combination is self-explanatory. Either the fifth or the sixth exemplary combination is executed depending on whether the branch is taken or not.

Thus, the fourth, fifth and sixth exemplary combinations of read/write/ALU operations can be used to effectuate the second stage execution of the JZ instruction. In particular, the fourth exemplary combination of read/write/ALU operations can be used to affect whether it is the fifth or the sixth exemplary combination of read/write/ALU operations that get executed. Similarly, as the LCALL instruction, the above description of employing the five exemplary combinations to effectuate the JZ instruction in two stages is strictly illustrative for one exemplary ISA. For another ISA, execution of the JZ instruction may be effectuated in more or less stages. The potential need for saving and restoring intermediate values were also not illustrated to facilitate easier understanding of the key concepts being described.

Thus, it can be seen that datapath 102 and control logic 104 constituted with BEB 200 of the present invention can be controlled to effectuate instruction execution and control decisions, through read and write operations directed against the addressable storage locations of the respective cache memory, and/or ALU operations performed by the respective ALUs. Those skilled in the art will recognize that the above illustrated exemplary read/write/ALU operation combinations are just a small sample of the read/write/ALU operation combinations of the present invention. Many more read/write/ALU operation combinations can be constructed to direct the various specific operations of the elements of datapath 102 and control logic 104 to effectuate instruction execution and control decision, and such constructions in accordance with the principles set forth by the disclosed illustrations are well within the ability of those skilled in the art.

Those skilled in the art will also appreciate that the number of elemental read, write and ALU operations necessary to form the various combinations are relative small, even when compared to a prior art reduced instruction set (RISC) computer. Most importantly, the above approach for effectuating instruction execution enables a processor designer to operate and optimize a processor design at a much higher and more productive level, than otherwise under the prior art conventional approaches.

Having now described the central concepts of the present invention, we turn now to other aspects. In some embodiments, the read, write and ALU POPs are hierarchically organized, and in other embodiments, the instructions may also be instructions of selected ones of a number of non-native or guest ISAs. These and other aspects will be described in turn.

Figure 2:
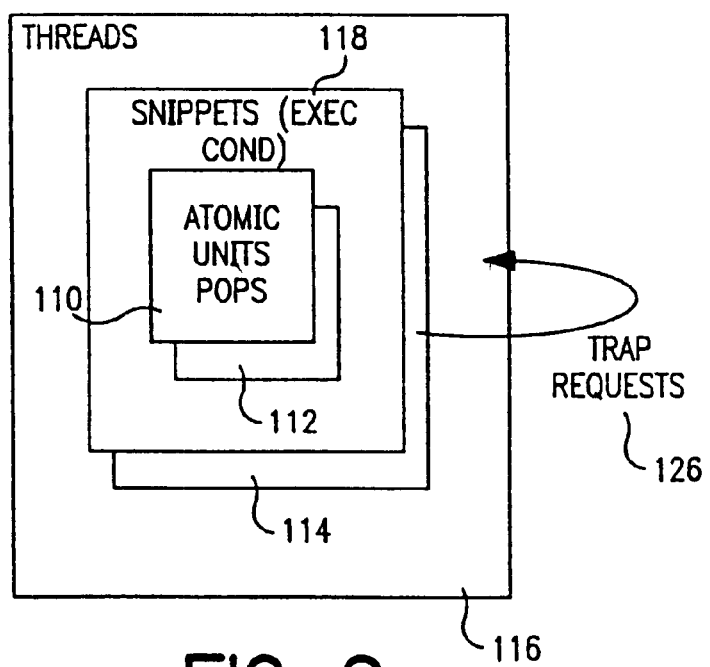
FIG. 2 illustrates one embodiment of an hierarchical organization of the POP of the present invention.

Referring now to FIG. 2 wherein a block diagram illustrating one embodiment of an hierarchical organization of the POP of the present invention is shown. As illustrated, selected ones of interdependent POP 110 having certain ensured order of completion are first combined to form atomic units 112. During operation, the member POP of an atomic unit 112 are dispatched at the same time, without the need of a micro-program counter. Next, selected ones of atomic units 112 are then combined to form snippets 114, with each snippet 114 having one or more atomic units 112. Then, selected ones of snippets 114 are logically associated to form execution threads 116, with each execution thread 116 having one or more snippets 114. During operation, selected ones of snippets 114 are dynamically scheduled. Furthermore, for the illustrated embodiment, an execution condition 118 may be specified for each atomic unit 112, governing the conditional execution of the atomic unit 112. Each execution condition 118 is expressed in terms of one or more dynamic decision variables to be examined during execution. Their values govern whether the atomic units 112 are to be executed or not. As described earlier, control logic 104 is equipped to maintain and process these dynamic decision variables. For the illustrated embodiment, execution conditions 118 governing the execution of the corresponding atomic units 112 are specified in snippets 114 to which the atomic units 112 are members of. Additionally, snippets 118 are logically associated to form execution threads 116. For the illustrated embodiment, snippets 118 are logically associated through trap requests 126 to control logic 104 made at the end of a predecessor snippet's execution.

Each instruction of a non-native or guest ISA is implemented using an execution thread 116 (hereinafter also referred to as implementing thread, or simply, thread). For this embodiment, the POP for effectuating increment of the macro instruction program counter (PC), to be described more fully below, are organized into a singular atomic unit snippet 114, and made an integral part of each execution thread 116. In an alternate embodiment, each instruction of a non-native or guest ISA is implemented using at least two execution threads 116. For this embodiment, the POP for effectuating increment of the PC are organized into a common singular snippet execution thread 116. This common singular snippet execution thread 116 is executed in conjunction with the execution threads 116 of the various instructions. In any case, the various threads 116 of hierarchically organized POP collectively implement the instructions of a non-native or guest ISA.

Referring now to FIGS. 3a–3c again, wherein one embodiment for organizing the earlier described exemplary POP is illustrated. For the illustrated embodiment, the POP are organized into atomic units, then snippets, and execution threads. As described earlier, FIG. 3a illustrates two exemplary combinations of POP for implementing an exemplary ADD instruction for adding an immediate to a destination register. The meanings of the two exemplary combinations were described earlier. The orderly completion of each of these exemplary combinations of POP are inherently ensured due to the timing characteristics of datapath 102. As a result, in accordance with the present invention, the two exemplary combinations of POP are correspondingly organized into two atomic units. Additionally, the two atomic units are further organized into a snippet, and then a singular snippet execution thread. During operation, once the snippet is scheduled, the two atomic units are executed in turn. Recall the POPs of each atomic units are provided to the appropriate elements at the same time, without the use of a micro-program counter, and their orderly completion are inherently ensured through the timing of the elements.

As described earlier, FIG. 3b illustrates four exemplary combinations of POP for implementing a long call (LCALL) instruction to be executed in two cycles. The meanings of these four exemplary combinations were explained earlier.

However, for the illustrated embodiment, the orderly completion of these POP is ensured only to the extent when they are segregated into two groups. Accordingly, they too are first organized as two atomic units, and then in turn they are combined to form a snippet. During operation, once scheduled, the entire snippet will be executed, with the POP of each atomic unit being issued in order, without the need of a micro-program counter. For each atomic unit, all POP are issued to the applicable elements at the same time, as described earlier.

In order to employ the two snippets together to effectuate the two stage execution of the LCALL instruction, in accordance with the present invention, the two snippets are logically associated together. For the illustrated embodiment, the two snippets are logically associated with each other using a trap request to control logic 104. In other words, in association with the definition of the first snippet, a trap to control logic 104 at the end of executing the first snippet is specified. The meanings of the various traps, i.e. in this case, the second snippet is to be scheduled for execution, are pre-defined for control logic 104. Other approaches to logically associating the snippets may be employed. Together, the two snippets form an execution thread for effectuating execution of the LCALL instruction. Again, as described earlier, effectuating execution of the LCALL instruction with two snippets (to simulate two stages) is straightly illustrative for a particular ISA. For other ISA, the implementing POP of the LCALL instruction may be organized into one or more snippets, as long as the order of execution is properly ensured.

As described earlier, FIG. 3c illustrates another six exemplary combinations of POP for implementing a Jump If Accumulator Zero (JZ) instruction. The meanings of the six exemplary combinations were described earlier. For the illustrated embodiment, the orderly completion of each of these combinations of POP is also ensured. Accordingly, they are organized as three separate atomic units, and then three singular atomic unit snippets. More importantly, the first snippet formed with the first and second exemplary combinations is logically associated to the "branch taken" snippet as well as the "branch not taken" snippet, but dynamically resolves to one or the other. The logical association is accomplished by specifying a trap request to be executed at the end of executing the first snippet. Furthermore, the trap request is defined to control logic 104 as being serviced by the snippet formed with the third exemplary combination of POP. The various snippets are organized to form the implementing thread for the JZ instruction.

Accordingly, upon executing the first snippet, BD is generated. As a result of the trap request to control logic 104 at the end of execution of the first snippet, the trap handler (i.e. the third exemplary combination) is executed, and the offset address is dynamically set to the appropriate one of either the "branch taken" or the "branch not taken" snippet. When invoked, the POP of the singular atomic unit of the "branch taken" or "branch not taken" snippet are issued to the applicable elements at the same time, without the employment of a micro-program counter. Also as described earlier, effectuating execution of the JZ instruction with multiple snippets (to simulate multiple stages) is straightly illustrative for a particular ISA. For other ISA, the implementing POP of the JZ instruction may be organized into one or more snippets, as long as the order of execution is properly ensured.

Figure 4:
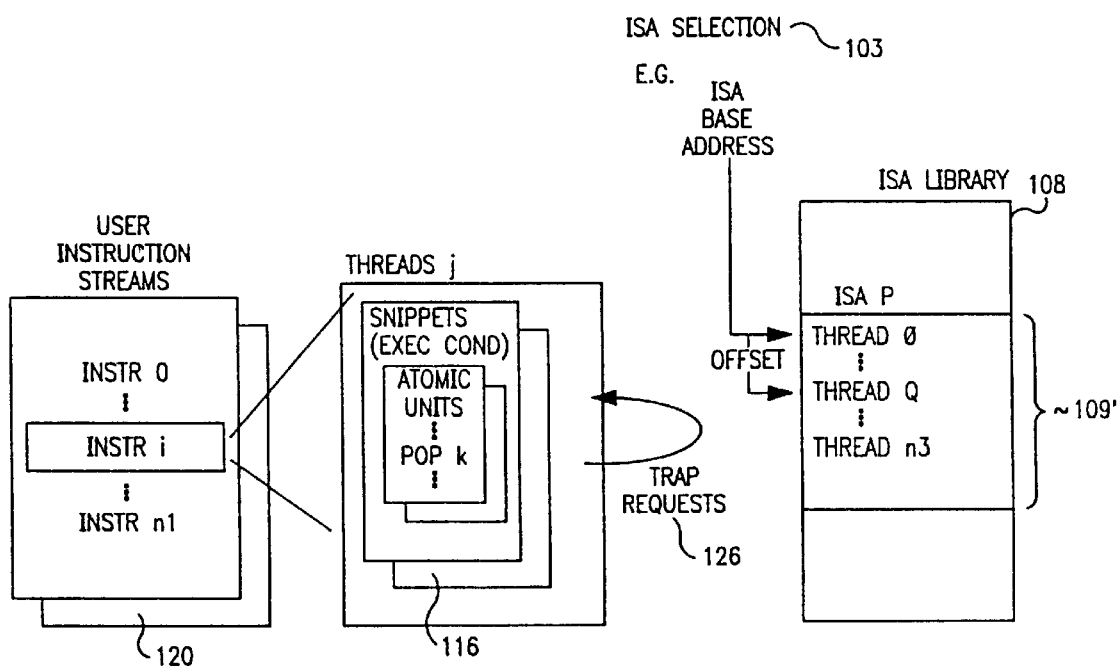
FIG. 4 illustrates the relationship between user instruction streams, instructions of an ISA, threads, ISA selector, and ISA library.

FIG. 4 illustrates the relationship between user instruction streams, instructions of a non-native or guest ISA, threads, ISA selector, and ISA library. Shown in FIG. 4 is user instruction stream 120 constituted with a number of instructions of a non-native or guest ISA. Examples of instructions are ADD R1, R2 and R3, and LD R4, memory address, meaning add the contents of registers R2 and R3 and place the sum of the addition in register R1, and load the content of memory address into register R4 respectively. As described earlier, each instruction is implemented with one or more threads 116 of POP. The various threads of POP 116 employed to implement a particular ISA are stored in ISA library 108. For the illustrated embodiment, each collection of ISA implementing POP also includes control information for the ISA, e.g. logical to physical mappings for cache memory based direct instruction execution, address space information, and so forth. In one embodiment, control logic 104 is equipped with storage medium to pre-stage or cache the implementing threads of an ISA. Whether pre-staged in control logic 104 or not, an ISA selector 103 corresponding to the user instruction stream is used to locate the start of all the implementing threads of the ISA. For the illustrated embodiment, ISA selector 103 is a base address to the starting memory location of collection 109'. Furthermore, the ISA selector 103 is stored in a context control block (CCB) created for a collection of user instruction stream, and dynamically updated if necessary (e.g. when the ISA changes between two user instruction streams). An offset address is used to locate the individual implementing threads. As described earlier, the offset address is a function of the opcode of an instruction plus a number of extended bits. In one embodiment, the offset address is stored in a process control (PCB) created for each process, e.g. an user instruction stream.

Thus, under the present invention, one or more collections of threads of POP implementing instructions of one or more ISA may be stored in ISA library 108. As a result, processor 100 may be initially deployed to effectuate execution of user instruction streams constituted with one ISA, and subsequently reconfigured to effectuate execution of user instruction streams constituted with another ISA. Alternatively, datapath 102 may be provided with multiple sets of resources, and by keeping track the ISA of corresponding user instruction streams 120, control logic 104 may control datapath 102 to effectuate execution of instructions of multiple ISA in parallel for multiple user instruction streams, using the multiple sets of resources. Regardless of whether datapath 102 is provided with multiple sets of resources or not, within one set of resources of datapath 102, by tracking the ISA of different user instruction streams, control logic 104 may control datapath 102 to effectuate execution of instructions of multiple ISA serially or interleavingly, for multiple user instruction streams, using one set of resources of datapath 102.

Figure 5:
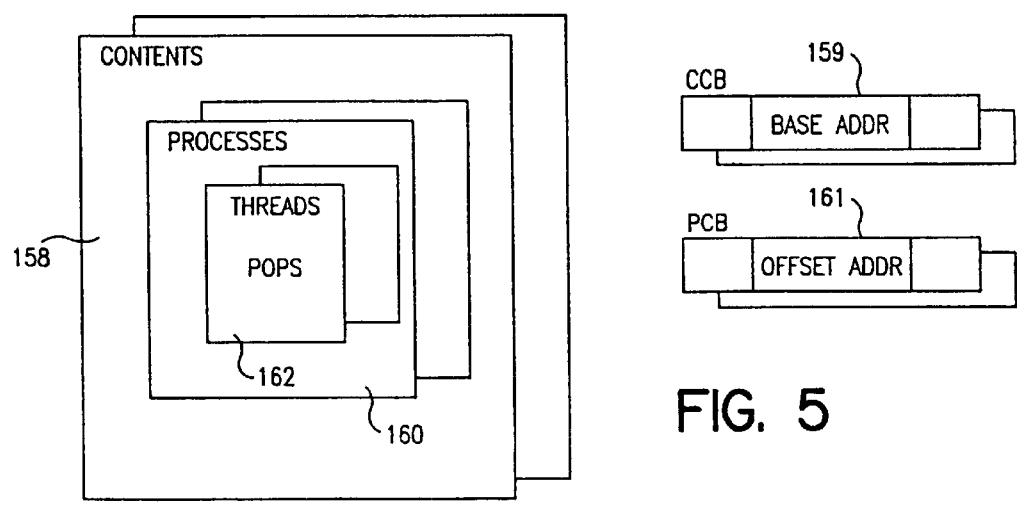
FIG. 5 illustrates the relationship between contexts, processes and threads.

FIG. 5 illustrates the relationship between contexts, processes, and threads as used herein. As shown, each context 158 includes one or more processes 160, and each process 160 in turn include one or more executing instances 162 of the earlier described threads 116, for effectuating execution of the instruction of the process 160, e.g. an user instruction stream. For the illustrated embodiment, associated with each context is a context control block (CCB) 159 storing control information about the context. These control information includes control variables known in the art. Additionally, in accordance with the present invention, the CCB includes in particular ISA selector 103, which for the illustrated embodiment is a base address control variable denoting the base address of the collection of implementing threads 116 of an ISA stored in ISA library 108 or a pre-stage storage structure of control logic 104, if the implementing threads are pre-staged in control logic 104. Similarly, associated with each process is a process control block (PCB) 161 storing control information about the process. The control information also includes various control variables known in the art. In addition, in accordance with the present invention, PCB includes in particular an offset address control variable denoting the offset (from the above described base address for an ISA) to the start of the implementing thread of the current executing thread instance. The CCB and PCB 159 and 161 are created and maintained by control logic 104. In particular, the base addresses and offset addresses are dynamically modified by control logic 104 as it detects changes in ISA and successively schedules the snippets of the implementing threads. The CCB and PCB 159 and 161 are created when a context and a process is first spawned. The base address is initially set in accordance with the ISA of a context, whereas the offset address is initially set to the beginning of the first implementing thread.

Referring now back to FIG. 1, responsive to an instruction of a process, control logic 104 statically schedules a first snippet of an implementing thread for execution by datapath 102, updating the PCB as appropriate. As the POP of each atomic unit of a scheduled snippet are provided in order to datapath 102 for execution, control logic dynamically control execution of the issued POP in accordance with the specified execution condition, if any. In one embodiment, control logic 104 is equipped to process dynamic decision variables as well as determining the appropriate state transitions for a process/context. For the illustrated embodiment, the processing of dynamic decision variables as well as determining the appropriate state transitions for the processes and contexts are also accomplished using hierarchically organized POP. Furthermore, as described earlier, control logic 104 is also equipped to service various trap requests. In addition to the above described trap requests that are made upon completing execution of the snippets, to logically associate the snippets, trap requests are also made in response to values being written into certain special addressable storage locations. Typically, these are addressable storage locations employed to store various control variables. Servicing of trap requests is also accomplished using hierarchically organized POP.

An example of such addressable storage location is the location employed to function as an accumulator of the processor. A trap request is made to control logic 104 whenever a value is stored into the accumulator location, to allow a trap handler to update the state of the parity bit of the processor status word (PSW). Another example is the locations employed to store various power control bits. A trap request is made to control logic 104 whenever a value is stored into these power control bit locations, to allow a trap handler to examine whether execution is to be halted. A further example is the location employed to store a reset bit. A trap request is made to control logic 104 whenever a value is stored into the reset bit location, to allow a trap handler to determine whether to shut down all contexts.

Additionally, for the illustrated embodiment, control logic 104 is also equipped to effectuate data input/output via input/output (I/O) pins 106. However, based on the description to follow, those skilled in the art will appreciate that the present invention may be practiced without control logic 104 being responsible for effectuating data I/O via I/O pins 106. The term I/0 pin as used herein is intended to include I/O pins in the conventional physical sense, as well as internal I/O "pins" in the figurative sense, employed to inter-couple internal blocks of a VLSI circuit. In other words, processor 100 is an embedded internal block of a larger VLSI circuit.

ISA library 108 may be implemented with any one of a number of non-volatile storage medium known in the art, including but not limited to EPROM, EEPROM, CMOS memory, Flash memory and so forth. Both datapath 102 and control logic 104, as well as their manner of cooperation will be further described below, after the descriptions of employing hierarchically organized POP to process dynamic decision variables, determine appropriate state transitions for processes and contexts, and service trap requests.

FIG. 6 illustrates three exemplary collections of POP employed to implement an add immediate with carry instruction (ADDC_1) instruction, including an exemplary collection of POP for processing a dynamic decision variable to facilitate control logic 104 in dynamically determining whether to further increment the result of the add instruction by one. The result is to be incremented if the carry flag is set. The first exemplary collection includes {Xlatn_Xaddr=*pC, XA_Sel=Xlatn_Xaddr, AX_Sel=X, Xlatn_Ymask 0x02, AY Sel=Xlatn_Ymask, ALU_Cmd= Add, Xlatn_Zaddr=*pC, ZA_Sel=Xlatn_Zaddr, Z_Sel= AZ}, whereas the second exemplary collection includes {Xlatn_Xaddr=dest_addr, XA_Sel=Xlatn_Xaddr, AX_Sel=X, AY_data=Imm, AY_Sel=AY_data, ALU_ Cmd=Add, Xlatn_Zaddr=dest_addr, ZA_Sel=Xlatn_ Zaddr, Z_Sel=AZ}. The third exemplary collection includes {Xlatn_Xaddr=*(psw.c), XA_Sel=Xlatn_Xaddr, Xlatn_ Zaddr=*BD, ZA_Sel=Xlatn_Zaddr, Z_Sel=X, whereas the fourth exemplary collection includes (AX_Sel=AZ, Xlatn_Ymask=0x01, AY_Sel=Xlatn_Ymask, ALU_ Cmd=Add, Xlatn_Zaddr=dest_addr, ZA_Sel=Xlatn_ Zaddr, Z_Sel=AZ}.

Based on the earlier described collections, the meanings of the first, the second, and the fourth exemplary collections are readily apparent. For the third exemplary collection, the enumerated POPs cause the content of the carry bit of control variable processor status word (psw) into the addressable storage location for storing the branch decision variable BD.

In accordance with the present invention, the first two exemplary collections are organized into two atomic units, and then into a first snippet. Similarly, the third and the fourth exemplary collections are also organized into two atomic units, and then into a second snippet. An execution condition governing the conditional execution of the second atomic unit of the second snippet, i.e. only if BD equals 1, is specified for the second atomic unit. The second snippet is logically associated with the first snippet by specifying a trap request to control logic 104, and pre-defining the trap request to modify the thread offset address to access the second snippet.

The present invention has been described in terms of the above described embodiments for ease of understanding. Those skilled in the art will recognize that the invention is not limited to the embodiments described. The present invention can be practiced with modification and alteration within the spirit and scope of the appended claims. The description is thus to be regarded as illustrative instead of restrictive on the present invention.

Thus, an effective approach to constituting a processor's datapath and control logic has been disclosed.

What is claimed is:

1. A computer implemented method to effectuate execution of an instruction, comprising:

a) selecting a read address for an addressable storage from two or more of a process source, a non-native to native ISA translation source, an output source of the addressable storage, and an output source of an ALU;

b) outputting a value by the addressable storage responsive to the selected read address.

2. A computer implemented method to effectuate execution of an instruction, comprising:
   a) selecting a write address for an addressable storage from two or more of a process source, a non-native to native ISA translation source, an output source of the addressable storage, and an output source of an ALU;
   b) selecting a write data from at least the process source, the non-native to native ISA translation source, an output source of the addressable storage, and the output source of an ALU; and
   c) writing the selected write data into the addressable storage in accordance with the selected write address.

3. A computer implemented method to effectuate execution of an instruction, comprising:
   a) selecting a first input from two or more of a process source, a non-native to native ISA translation source, an output source of an addressable storage, and an output source of an ALU;
   b) selecting a second input from at least the process source, the non-native to native ISA translation source, a second output source of the addressable storage, and the output source of the ALU; and
   c) performing an ALU operation on the selected first and second inputs.

* * * * *